H. T. BLAKE.
Cap for Wood-Screws.
No. 160,148.   Patented Feb. 23, 1875.
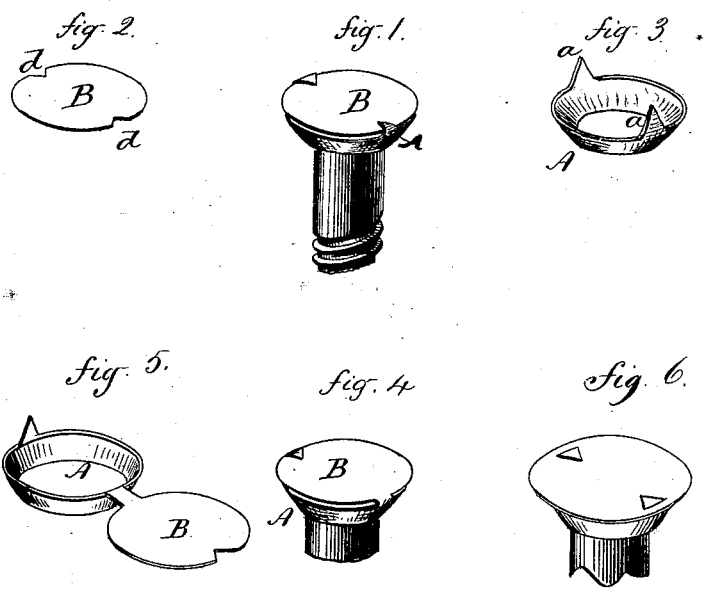

UNITED STATES PATENT OFFICE.

HENRY T. BLAKE, OF NEW HAVEN, CONNECTICUT.

IMPROVEMENT IN CAPS FOR WOOD-SCREWS.

Specification forming part of Letters Patent No. 160,148, dated February 23, 1875; application filed February 5, 1875.

*To all whom it may concern:*

Be it known that I, HENRY T. BLAKE, of New Haven, in the county of New Haven and State of Connecticut, have invented a new Covering for Screw-Heads; and I do hereby declare the following, when taken in connection with the accompanying drawings and the letters of reference marked thereon, to be a full, clear, and exact description of the same, and which said drawings constitute part of this specification, and represent, in—

Figure 1, perspective view of a screw with the head covered; Figs. 2 and 3, perspective views of the two parts of the cover; Figs. 4 and 5, modifications of the same.

This invention relates to a device for covering screw-heads after they have been driven, for the purpose of making the head an ornament rather than a disfigurement; and the invention consists in a collar encircling the neck below the head, and set upon the screw before driving, and constructed with spurs or equivalent projections above the surface of the head, combined with a plate covering the outer surface of the head secured after the screw is driven by said spurs, as more fully hereinafter described.

A is the collar, seen detached in Fig. 3. It is formed to substantially fit the under side of the head, and with spurs *a* upon its upper edge. The screw is set through this collar and driven home. The spurs *a* project above the surface of the head. B is the covering-disk, which may be ornamented to suit the trade. After the screw is driven this disk is placed over the head, and the spurs *a* turned down thereon, as seen in Fig. 1. This secures the disk, and the head is completely covered and the nick hidden. The ornamentation of the disk should be such that the spurs will seem to form a part of that ornamentation, but if the disk be left plain the spurs are so small that they do not disfigure the surface. There may be a series of such spurs entirely around the collar, so that when turned down upon the disk they would form an ornamental edge around the head. Preferably notches *d* are formed in the disk where the spurs come, but smaller than the spurs. These prevent the transverse movement of the disk. The disk may be formed as a part of the collar, as seen in Fig. 5, the two connected at one point only, and, when the screw is driven, the disk is turned down upon the head, and secured by a spur upon the opposite side, as in Fig. 4. The disk may be larger than the screw-head, and perforated to allow it to be set down over the spurs, as in Fig. 6—the spurs bent down upon the surface as before.

I claim—

A cover for screw-heads, consisting of the collar A, constructed with one or more spurs, *a*, combined with the disk B, substantially as described.

HENRY T. BLAKE.

Witnesses:
JOHN E. EARLE,
JNO. D. PATTEN.